(12) United States Patent
Toyoda et al.

(10) Patent No.: US 9,873,164 B2
(45) Date of Patent: *Jan. 23, 2018

(54) ELECTRIC RESISTANCE WELDED STEEL PIPE OR STEEL TUBE HAVING EXCELLENT HIC RESISTANCE AND LOW-TEMPERATURE TOUGHNESS IN ELECTRIC RESISTANCE WELDED PART, AND METHOD FOR MANUFACTURING THE SAME

(71) Applicant: JFE STEEL CORPORATION, Tokyo (JP)

(72) Inventors: Shunsuke Toyoda, Tokyo (JP); Sota Goto, Tokyo (JP); Takatoshi Okabe, Tokyo (JP); Atsushi Yonemoto, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 290 days.

This patent is subject to a terminal disclaimer.

(21) Appl. No.: 14/430,771

(22) PCT Filed: Sep. 20, 2013

(86) PCT No.: PCT/JP2013/005559
§ 371 (c)(1),
(2) Date: Mar. 24, 2015

(87) PCT Pub. No.: WO2014/045590
PCT Pub. Date: Mar. 27, 2014

(65) Prior Publication Data
US 2015/0251268 A1   Sep. 10, 2015

(30) Foreign Application Priority Data
Sep. 24, 2012   (JP) ................... 2012-209158

(51) Int. Cl.
*B32B 5/00* (2006.01)
*B23K 11/00* (2006.01)
(Continued)

(52) U.S. Cl.
CPC .......... *B23K 11/0006* (2013.01); *B21B 23/00* (2013.01); *B21C 37/08* (2013.01);
(Continued)

(58) Field of Classification Search
CPC .............. B23K 11/0873; B23K 13/025; B23K 35/3073; B23K 11/0006; B23K 2201/06;
(Continued)

(56) References Cited

U.S. PATENT DOCUMENTS 5,213,633 A * 5/1993 Hada ....................... C22C 38/06
138/177
2005/0034795 A1   2/2005 Motoyoshi et al.

FOREIGN PATENT DOCUMENTS

CA   2 353 984 A1   7/2000
CN   1331757 A   1/2002
(Continued)

OTHER PUBLICATIONS

NPL-Translation of JP 62-274049 (translated:Jun. 15, 2017).*
(Continued)

*Primary Examiner* — David R Sample
*Assistant Examiner* — Elizabeth Collister
(74) *Attorney, Agent, or Firm* — Oliff PLC

(57) ABSTRACT

Electric resistance welded steel pipes or steel tubes with a tensile property TS of not less than 434 MPa which have electric resistance welded parts exhibiting both excellent HIC resistance and excellent low-temperature toughness, and methods for manufacturing such steel pipes or steel tubes.

4 Claims, 3 Drawing Sheets

(51) Int. Cl.

| | | |
|---|---|---|
| C21D 9/08 | (2006.01) | |
| C21D 9/50 | (2006.01) | |
| C22C 38/00 | (2006.01) | |
| C22C 38/04 | (2006.01) | |
| B23K 11/087 | (2006.01) | |
| B23K 13/02 | (2006.01) | |
| C22C 38/02 | (2006.01) | |
| C22C 38/06 | (2006.01) | |
| C22C 38/08 | (2006.01) | |
| C22C 38/12 | (2006.01) | |
| C22C 38/14 | (2006.01) | |
| C22C 38/16 | (2006.01) | |
| C22C 38/18 | (2006.01) | |
| B23K 35/30 | (2006.01) | |
| B21B 23/00 | (2006.01) | |
| B21C 37/08 | (2006.01) | |
| C21D 1/60 | (2006.01) | |
| C21D 1/613 | (2006.01) | |
| C21D 6/00 | (2006.01) | |
| C22C 38/20 | (2006.01) | |
| C22C 38/28 | (2006.01) | |
| C22C 38/32 | (2006.01) | |
| C22C 38/34 | (2006.01) | |
| C22C 38/38 | (2006.01) | |
| F16L 9/02 | (2006.01) | |
| B23K 101/06 | (2006.01) | |
| B23K 103/04 | (2006.01) | |

(52) U.S. Cl.
CPC ........ *B23K 11/0873* (2013.01); *B23K 13/025* (2013.01); *B23K 35/3053* (2013.01); *B23K 35/3073* (2013.01); *C21D 1/60* (2013.01); *C21D 1/613* (2013.01); *C21D 6/001* (2013.01); *C21D 6/002* (2013.01); *C21D 6/004* (2013.01); *C21D 6/005* (2013.01); *C21D 6/008* (2013.01); *C21D 9/08* (2013.01); *C21D 9/50* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/28* (2013.01); *C22C 38/32* (2013.01); *C22C 38/34* (2013.01); *C22C 38/38* (2013.01); *F16L 9/02* (2013.01); *B23K 2201/06* (2013.01); *B23K 2203/04* (2013.01); *Y10T 428/12* (2015.01)

(58) Field of Classification Search
CPC ........................ B23K 2203/04; B23K 35/3053; C22C 38/02; C22C 38/04; C22C 38/06; C22C 38/00; C22C 38/001; C22C 38/002; C22C 38/08; C22C 38/12; C22C 38/14; C22C 38/16; C22C 38/18; C22C 38/20; C22C 38/28; C22C 38/32; C22C 38/34; C22C 38/38; C22C 38/58; B21C 37/08; B21B 23/00; C21D 1/60; C21D 1/613; C21D 6/001; C21D 6/002; C21D 6/004; C21D 6/005; C21D 6/008; C21D 9/08; C21D 9/50; F16L 9/02; Y10T 428/12
See application file for complete search history.

(56) References Cited

FOREIGN PATENT DOCUMENTS

| | | | |
|---|---|---|---|
| CN | 102154593 A | | 8/2011 |
| EP | 1568792 A1 | | 8/2005 |
| EP | 2133160 A1 | | 12/2009 |
| EP | 2258493 A1 | | 12/2010 |
| EP | 2 837 708 A1 | | 2/2015 |
| EP | 2 868 765 A1 | | 5/2015 |
| JP | S60-213366 A | | 10/1985 |
| JP | 62-274049 A | * | 11/1987 |
| JP | H02-258181 A | | 10/1990 |
| JP | H04-178281 A | | 6/1992 |
| JP | 2000-204442 A | | 7/2000 |
| JP | 2004-162125 A | | 6/2004 |
| JP | 2006-077330 A | | 3/2006 |
| JP | 2006-144109 A | | 6/2006 |
| JP | 2006-175514 A | | 7/2006 |
| JP | 2007-000874 A | | 1/2007 |
| JP | 2008-223134 A | | 9/2008 |
| JP | 2011-206813 A | | 10/2011 |
| JP | 2011-246793 A | | 12/2011 |
| JP | 2012-246548 A | | 12/2012 |
| JP | 2012-246550 A | | 12/2012 |
| RU | 2360013 C2 | | 6/2009 |
| RU | 2429093 C2 | | 9/2011 |
| RU | 2448796 C1 | | 4/2012 |

OTHER PUBLICATIONS

NPL-API 5L X Grades, PM Internatioional Suppliers, [retrieved on Jun. 20, 2017]. Retrieved from the internet<URL: http://www.api5lx.com/api5lx-grades/index.php>.*

May 31, 2016 Office Action issued in Korean Patent Application No. 10-2015-7009433.

Oct. 13, 2015 Search Report issued in European Application No. 13839516.5.

Dec. 17, 2013 International Search Report issued in PCT/JP2013/005559.

Feb. 1, 2016 Office Action issued in Chinese Application No. 201380048260.X.

Oct. 31, 2016 Office Action issued in Russian Patent Application No. 2015115469.

* cited by examiner

TOTAL OF Si, Mn, Al, Ca AND Cr PRESENT IN INCLUSIONS HAVING EQUIVALENT CIRCLE DIAMETER OF 8 μm OR MORE (ppm)

a+b: 0.02-0.8t

ELECTRIC RESISTANCE WELDED STEEL PIPE OR STEEL TUBE HAVING EXCELLENT HIC RESISTANCE AND LOW-TEMPERATURE TOUGHNESS IN ELECTRIC RESISTANCE WELDED PART, AND METHOD FOR MANUFACTURING THE SAME

TECHNICAL FIELD

This application is directed to electric resistance welded steel pipes or steel tubes with a tensile strength (TS) of not less than 434 MPa which are suited for use in the extraction or transportation of resources such as crude oil and natural gas. In particular, the application relates to a technique for enhancing the hydrogen induced cracking resistance and the low-temperature toughness of electric resistance welded parts.

BACKGROUND

Electric resistance welded steel pipes or steel tubes have been heretofore frequently used in the extraction or transportation of resources such as crude oil and natural gas. Electric resistance welded steel pipes or steel tubes have electric resistance welded parts. From the viewpoint of the reliability of electric resistance welded parts, the use of the steel pipes or tubes has been limited to applications which require low levels of hydrogen induced cracking resistance (hereinafter, also written as HIC resistance) and low-temperature toughness of electric resistance welded parts. Thus, there have been strong demands for electric resistance welded steel pipes or steel tubes having excellent HIC resistance and excellent low-temperature toughness.

To meet such demands, for example, Patent Literature 1 describes electric resistance welded steel pipes or steel tubes with excellent sour resistance that are made of Al deoxidized steel containing 0.0012% or more of calcium. According to the technique described in Patent Literature 1, the Ca/Al ratio is controlled to 0.10 or less, the ratio of the length in the through-thickness direction to the length in the circumferential direction is controlled to 2 or more, and the density of inclusions having a major diameter of 10 μm or more is controlled to 5 particles or less per 1 mm². These configurations allegedly make it possible to prevent the occurrence of hydrogen induced blister cracking even under a severe environment with a low pH and enable the electric resistance welded steel pipes or steel tubes to exhibit excellent sour resistance.

Patent Literature 2 describes a method for the gas shield welding of electric resistance welded steel pipes or steel tubes which may enhance the toughness of electric resistance welded parts. The technique described in Patent Literature 2 is characterized in that suspended scales on the inner side of the pipe are removed by mist washing between after fin pass forming and before welding, and the local gas shielding of a welded part is performed in such a manner that any rollers except the shielding arrangement holding rollers on the inner side of the pipe are kept away from contact with the pipe during the local shielding of the welded part. In this manner, there remain no scales in the electric resistance welded part, and the toughness of the electric resistance welded part is markedly enhanced.

Patent Literature 3 describes API X80 or higher grade high tensile strength thin-walled electric resistance welded line pipes or tubes. In the technique described in Patent Literature 3, the line pipes are electric resistance welded steel pipes or steel tubes manufactured by subjecting hot rolled steel coils to steps including cold roll forming, electric resistance welding, heat treatment of seam, and sizing treatment, the electric resistance welded steel pipes or steel tubes being such that the outer diameter is 200 mm to 610 mm, the thickness/outer diameter ratio (t/D) is not more than 2%, the metallic structure is an acicular ferrite structure with an average grain size of not more than 5 μm, the oxide-occupied area in the electric resistance welded butt part is not more than 0.1% (1000 ppm), and the tensile strength in a circumferential direction after flattening is not less than 700 N/mm². These configurations allegedly ensure that the base metal has excellent toughness and the electric resistance welded butt part is as sound as the base metal.

Patent Literature 4 describes electric resistance welded steel pipes or steel tubes for boilers which have few defects in electric resistance welded parts and have excellent creep rupture strength and toughness. The electric resistance welded steel pipes or steel tubes for boilers described in Patent Literature 4 are such that the steel contains, by mass %, C: 0.01 to 0.20%, Si: 0.01 to 1.0%, Mn: 0.10 to 2.0%, Cr: 0.5 to 3.5%, P: not more than 0.030%, S: not more than 0.010%, O: not more than 0.020%, Nb: 0.001 to 0.5%, V: 0.02 to 1.0% and B: 0.0003 to 0.01%, the (Si %)/(Mn %+Cr %) ratio is 0.202 to 1.5, and the area ratio of a ternary oxide mixture of $SiO_2$, MnO and $Cr_2O_3$ formed during electric resistance welding is not more than 0.1%. With these configurations, the electric resistance welded steel pipes or steel tubes for boilers allegedly achieve excellent weldability of electric resistance welding and also exhibit excellent creep rupture strength.

CITATION LIST

Patent Literature

PTL 1: Japanese Unexamined Patent Application Publication No. 60-213366

PTL 2: Japanese Unexamined Patent Application Publication No. 4-178281

PTL 3: Japanese Unexamined Patent Application Publication No. 2008-223134

PTL 4: Japanese Unexamined Patent Application Publication No. 2006-77330

SUMMARY

Technical Problem

The technique described in Patent Literature 1 provides excellent HIC resistance in a certain environment (0.5% $CH_3COOH$+synthetic seawater (3% NaCl)+saturated $H_2S$). However, the technique described in Patent Literature 1 is insufficient in terms of the control of inclusions. Further, the technique described in Patent Literature 1 has a problem in that the occurrence of hydrogen induced cracking (HIC) cannot be avoided in a severer corrosion environment, namely, in a NACE TM0284 Solution A (0.5% $CH_3COOH$+ 5% NaCl+saturated $H_2S$) environment. The presence of 5 particles of inclusions having a major diameter of 10 μm or more per 1 mm² corresponds to an area ratio of 0.05% (500 ppm) or, even given that the ratio of the major diameter to the minor diameter is 2, corresponds to an area ratio of approximately 100 ppm. Thus, the electric resistance welded steel pipes or steel tubes manufactured by the technique described in Patent Literature 1 are applicable to an environment that is as severe as or less severe than 0.5%

CH₃COOH+synthetic seawater (approximately 3% NaCl concentration)+saturated H₂S. The use of such steel pipes or tubes in any severer corrosion environment gives rise to a risk of the occurrence of HIC. In particular, it is difficult to avoid the occurrence of HIC in NACE TM0284 Solution A (a 0.5% CH₃COOH+5% NaCl+saturated H₂S environment) that is the standard severe environment condition currently used. Further, the technique described in Patent Literature 1 is unsatisfactory in terms of low-temperature toughness and is still to be improved for the application in cold places.

In the technique described in Patent Literature 2, the electric resistance welded parts exhibit a high absorbed energy (a high toughness of the electric resistance welded parts) of about 20 kgfm or more in a Charpy impact test only at temperatures down to −50° F. (corresponding to −45.5° C.), and the low-temperature toughness is problematically deteriorated at extremely-low temperatures of −60° C. or below. Further, the steel pipes or tubes manufactured by the technique described in Patent Literature 2 do not have good HIC resistance in a severe corrosion environment.

The technique described in Patent Literature 3 produces electric resistance welded steel pipes or steel tubes in which the oxide-occupied area in the electric resistance welded part is not more than 0.1% (1000 ppm). However, decreasing the amount of oxides to this level only allows the electric resistance welded parts to achieve as low an absorbed energy as less than 100 J in a Charpy impact test at −20° C. Thus, the technique described in Patent Literature 3 has a problem in that the electric resistance welded parts cannot achieve a good low-temperature toughness of 120 J or more in terms of absorbed energy in a Charpy impact test at −60° C.

In the technique described in Patent Literature 4, the melting point of the mixed oxide is decreased to make it possible to reduce the occurrence of weld defects in the electric resistance welded parts and to prevent the electric resistance welded parts from deteriorations in creep characteristics and toughness. However, the electric resistance welded parts obtained by the technique described in Patent Literature 4 have a fracture transition temperature in a Charpy impact test of approximately 0 to −50° C. Thus, the technique is still incapable of producing electric resistance welded parts exhibiting a good low-temperature toughness of 120 J or more in terms of absorbed energy in a Charpy impact test at −60° C.

To solve the problems in the art described above, it is an object of this disclosure to provide electric resistance welded steel pipes or steel tubes with a tensile strength TS of not less than 434 MPa which have electric resistance welded parts exhibiting both excellent HIC resistance and excellent low-temperature toughness. Here, the term "excellent HIC resistance" means that the crack area ratio (CAR) is not more than 3% after the steel pipes or tubes are soaked in a NACE Solution A (0.5% CH₃COOH+5% NaCl+saturated H₂S) environment in accordance with NACE TM0284 for 200 hours. Further, the term "excellent low-temperature toughness" means that the absorbed energy $vE_{-60}$ measured by a Charpy impact test at −60° C. in accordance with JIS Z 2242 is not less than 120 J and also the crack tip opening displacement (CTOD) value measured by a CTOD test at −20° C. in accordance with WES 1108 (1995) is not less than 0.3 mm. In embodiments, the Charpy fracture transition temperature vTrs is −60° C. or below.

Solution to Problem

To achieve the above object, the present inventors extensively studied the influences of oxide constituent elements, the size of oxides, and the number or amount of oxides on the HIC resistance and the low-temperature toughness of electric resistance welded parts. As a result, the present inventors have first reached a conclusion that the viscosity of oxides formed in edges of steel strips during electric resistance welding has a significant influence on the HIC resistance and the low-temperature toughness of electric resistance welded parts, and have found that the HIC resistance and the low-temperature toughness of electric resistance welded parts are markedly enhanced by controlling the viscosity of oxides formed in edges of steel strips during electric resistance welding to 2 poise or less.

Up to the present time, any reasons are not clear as to why HIC resistance and low-temperature toughness are enhanced by controlling the viscosity of oxides formed during electric resistance welding to 2 poise or less. It is believed that the enhancements are ascribed to the ability of the oxides having the above low viscosity to be squeezed out without remaining in the welded parts when the molten metal formed in the edges of steel strips is squeezed by electromagnetic nature pressure or when the molten metal is squeezed by upsetting (or pressure welding).

First, there will be described the results of experiments carried out by the present inventors that form the basis for disclosed embodiments.

Hot rolled steel sheets (sheet thickness: 20.6 mm) having various chemical compositions were provided which included, by mass %, 0.01 to 0.80% carbon, 0 to 2.50% silicon, 0.15 to 3.00% manganese, 0.009 to 0.0125% sulfur, 0.001 to 0.035% phosphorus, 0 to 0.70% aluminum, 0 to 3.50% chromium, 0 to 0.0060% calcium, and 0 to 0.085% niobium, the balance being iron and inevitable impurities. The steel sheets were formed into open pipes by continuous cold forming with rolls. The edges in the width direction of the open pipes were electric resistance welded while changing the welding conditions of electric resistance welding such as the concentration of oxygen in the atmosphere with respect to the types of the hot rolled steel sheets and further changing the conditions of upsetting with squeeze rolls with respect to the types of the hot rolled steel sheets. In this manner, electric resistance welded steel pipes or steel tubes of the various hot rolled steel sheets having an outer diameter of 660 mm were obtained. For some of the electric resistance welded steel pipes or steel tubes, grooves (groove angle: 30°) were formed in edges in the width direction of the steel strips by the use of fin pass rolls during roll forming. For some of the electric resistance welded steel pipes or steel tubes, the electric resistance welded part was subjected to quenching and tempering treatment (seam QT).

HIC test pieces (size: 10 mm in thickness×20 mm in width×100 mm in length) were sampled from the electric resistance welded parts of the electric resistance welded steel pipes or steel tubes in such a manner that the direction of the length of the test pieces would be the direction of tube axis and the electric resistance welded part would be at the center in the direction of the length of the test piece. The test pieces were subjected to an HIC test. The HIC test was performed by soaking the test pieces in NACE TM0284 Solution A (0.5% CH₃COOH+5% NaCl+saturated H₂S) for 200 hours. After the soaking, the surface of the test pieces was analyzed by ultrasonic flaw detection, and the crack area ratio (CAR) was obtained by image treatment.

Separately, Charpy impact test pieces (V notch test pieces) were sampled from the electric resistance welded steel pipes or steel tubes in both circumferential directions starting from the electric resistance welded part in accordance with JIS Z 2242. The presence of a notch was confirmed by etching, and the electric resistance welded part was located in the center. The Charpy impact test pieces (the V notch test pieces) were subjected to an impact test to measure the absorbed energy. The testing temperature was −60° C., and three test pieces were tested with respect to each electric resistance welded steel pipe or steel tube. The arithmetic average was obtained as the toughness (the absorbed energy) $vE_{-60}$ of the electric resistance welded part of the electric resistance welded steel pipe or steel tube.

The viscosity of oxides formed during electric resistance welding was calculated with respect to each electric resistance welded steel pipe or steel tube. The viscosity of oxides formed during electric resistance welding may be determined based on the liquid steel temperature during electric resistance welding and the chemical compositions of oxides formed during electric resistance welding, and may be calculated using the following equation described in P. V. Riboud et. al.: Fachber. Heuteenprax. Metall weiterverrarb., 19 (1981) 859.

$$\text{Viscosity of oxides(poise)} = 10 \times A_R T \exp(B_R/T) \quad (1)$$

T: absolute temperature (K)
$A_R$: exp $\{-19.81+1.73\ (X_{CaO}+X_{MnO})-35.75X_{Al2O3}\}$
$B_R$: $31140-23896 \times \{(X_{CaO}+X_{MnO})+68833X_{Al2O3}\}$
$X_{CaO}$, $X_{MnO}$ and $X_{Al2O3}$: molar fractions of CaO, MnO and $Al_2O_3$ in oxides The calculation of the viscosity used molar fractions obtained at 1550° C. that was a temperature experienced during electric resistance welding. The chemical compositions of oxides formed during electric resistance welding are determined by the chemical compositions of the hot rolled steel sheets that are the materials for electric resistance welded steel pipes or steel tubes, and the time between welding of the steel sheet edges, and upsetting.

The obtained results are illustrated in FIG. 1, in which relationships are shown between the CAR of the electric resistance welded parts or $vE_{-60}$ of the electric resistance welded parts, and the viscosity of oxides formed during electric resistance welding.

From FIG. 1, it has been shown that when the viscosity of oxides formed during electric resistance welding is 2 poise or less, the electric resistance welded steel pipes or steel tubes achieve excellent HIC resistance in the electric resistance welded parts with the CAR of the electric resistance welded parts being not more than 3% even in a severe corrosion environment, and also achieve an enhancement in low-temperature toughness in the electric resistance welded parts with $vE_{-60}$ being 120 J or more.

The present inventors carried out further studies and obtained the following findings. First, decreasing the viscosity of oxides formed during electric resistance welding to 2 poise or less allows the oxides to be easily squeezed out from electric resistance welded parts. Secondly, by virtue of the decrease in viscosity, the obtainable electric resistance welded parts may be such that the total amount of silicon, manganese, aluminum, calcium and chromium present in inclusions having an equivalent circle diameter of 8 μm or more is reduced to 16 ppm by mass or less in terms of mass % relative to the total mass of a 2 mm wide portion of the electric resistance welded part including base iron. Based on these findings, it has been found that the HIC resistance and the low-temperature toughness of electric resistance welded parts may be enhanced according to disclosed embodiments.

FIG. 2 illustrates relationships between the results of the aforementioned measurement of the CAR of the electric resistance welded parts or $vE_{-60}$ of the electric resistance welded parts, and the total amount of silicon, manganese, aluminum, calcium and chromium present in inclusions having an equivalent circle diameter of 8 μm or more (the amount in terms of mass % relative to the total mass of a 2 mm wide portion of the electric resistance welded part including base iron).

From FIG. 2, it has been shown that when the total of silicon, manganese, aluminum, calcium and chromium in inclusions having an equivalent circle diameter of 8 μm or more is 16 ppm or less, the electric resistance welded steel pipes or steel tubes achieve excellent HIC resistance in the electric resistance welded parts with the CAR of the electric resistance welded parts being not more than 3% even in a severe environment, and also achieve an enhancement in low-temperature toughness in the electric resistance welded parts with $vE_{-60}$ being 120 J or more.

The total amount of silicon, manganese, aluminum, calcium and chromium present in inclusions having an equivalent circle diameter of 8 μm or more was obtained in the following manner.

Plate specimens for electrolytic extraction (size: tube thickness×2 mm in width×20 mm in length) were sampled from the electric resistance welded steel pipes or steel tubes so that the electric resistance welded part would be located in the center of the specimen. The specimens were soaked in a 10% AA liquid as an electrolytic solution (AA liquid: 10 vol % acetylacetone-1 mass % tetramethylammonium chloride-methanol) to electrolytically extract inclusions. The electrolytic extract (inclusions) obtained was filtered through a filter mesh having a pore diameter of 8 μm. The electrolytic extract that had been filtered (inclusions having an equivalent circle diameter of 8 μm or more) was subjected to alkali fusion and was analyzed by ICP analysis (inductively coupled plasma mass spectrometry) to determine silicon, manganese, aluminum, calcium and chromium present in the inclusions. By this analysis, the total content of silicon, manganese, aluminum, calcium and chromium in the inclusions having an equivalent circle diameter of 8 μm or more was obtained in terms of mass % relative to the total mass of the 2 mm wide portion of the electric resistance welded part including base iron.

Based on the above results, the present inventors have found that electric resistance welded steel pipes or steel tubes having electric resistance welded parts excellent in HIC resistance and low-temperature toughness may be manufactured by decreasing the viscosity of oxides formed during electric resistance welding to 2 poise or less through appropriate control of the chemical composition of steel sheets (hot rolled steel sheets) that are materials and also through the adoption of appropriate electric resistance welding conditions, and thereby decreasing the amount of alloy elements such as silicon, manganese and aluminum in inclusions found in the electric resistance welded parts to or below the specific level.

This disclosure is based on the aforementioned findings and on further studies. A summary of disclosed embodiments follows.

(1) An electric resistance welded steel pipe or steel tube having a controlled chemical composition including, by mass %, C: 0.03 to 0.59%, Si: 0.10 to 0.50%, Mn: 0.40 to 2.10% and Al: 0.01 to 0.35%, the Si content and the Mn content being such that Mn/Si (mass ratio) is in the range of 6.0 to 9.0, the balance being Fe and inevitable impurities, the steel pipe or steel tube having a tensile strength TS of not less than 434 MPa, the steel pipe or steel tube including an electric resistance welded part in which the total amount of silicon, manganese, aluminum, calcium and chromium present in inclusions having an equivalent circle diameter of 8

µm or more is not more than 16 ppm in terms of mass % relative to the total mass of a 2 mm wide portion of the electric resistance welded part including base iron, the electric resistance welded part having both excellent HIC resistance and excellent low-temperature toughness.

(2) The electric resistance welded steel pipe or steel tube described in (1), wherein the chemical composition further includes, by mass %, Ca: 0.0001 to 0.0040%.

(3) The electric resistance welded steel pipe or steel tube described in (1) or (2), wherein the chemical composition further includes, by mass %, Cr: 0.01 to 1.09%.

(4) The electric resistance welded steel pipe or steel tube described in any of (1) to (3), wherein the chemical composition further includes, by mass %, one or more selected from Cu: 0.01 to 0.35%, Mo: 0.01 to 0.25%, Ni: 0.01 to 0.20% and B: 0.0001 to 0.0030%.

(5) The electric resistance welded steel pipe or steel tube described in any of (1) to (4), wherein the chemical composition further includes, by mass %, one or more selected from Nb: 0.001 to 0.060%, V: 0.001 to 0.060% and Ti: 0.001 to 0.080%.

(6) A method for manufacturing electric resistance welded steel pipes or steel tubes including continuously roll forming a hot rolled steel strip into an open pipe or tube having an approximately circular cross section, welding the open pipe or tube by electric resistance welding in which regions of the open pipe or tube including butt parts are heated to or above the melting point and the pipe or tube is upset with a squeeze roll to form an electric resistance welded part, and subjecting the electric resistance welded part to online heat treatment, the method being characterized in that the hot rolled steel strip has a controlled chemical composition including, by mass %, C: 0.03 to 0.59%, Si: 0.10 to 0.50%, Mn: 0.40 to 2.10% and Al: 0.01 to 0.35%, the Si content and the Mn content being such that Mn/Si is in the range of 6.0 to 9.0, the balance being Fe and inevitable impurities, the hot rolled steel strip having a tensile strength TS of not less than 434 MPa, and the electric resistance welding is performed while controlling the concentration of oxygen in an atmosphere during the electric resistance welding and/or while controlling the time from the onset of melting by the heating to the upsetting so as to control the viscosity of an oxide formed during the electric resistance welding to 2 poise or less, the electric resistance welded part having both excellent HIC resistance and excellent low-temperature toughness.

(7) The method for manufacturing electric resistance welded steel pipes or steel tubes described in (6), wherein the roll forming includes fin pass forming and the fin pass forming forms tapered grooves in edges on both sides in the width direction of the hot rolled steel strip, the tapered grooves being formed such that the total of distances in the through-thickness direction of the hot rolled steel strip between a starting location of taper and a surface defining an outer surface of the pipe or tube or a surface defining an inner surface of the tube or pipe is 2 to 80% of the thickness of the hot rolled steel strip.

(8) The method for manufacturing electric resistance welded steel pipes or steel tubes described in (6) or (7), wherein the time from the onset of melting by the heating to the upsetting is controlled to 0.2 to 4 seconds.

(9) The method for manufacturing electric resistance welded steel pipes or steel tubes described in any of (6) to (8), wherein the electric resistance welding is performed while controlling the concentration in volume ratio of oxygen in the atmosphere during the electric resistance welding to or below $1000/f_{oxy}$ ppm wherein foxy is the oxidization tendency of liquid steel defined by Equation (1) below:

$$f_{oxy}=Mn+10(Si+Cr)+100Al+1000Ca \quad (1)$$

wherein Mn, Si, Cr, Al and Ca are the contents (mass %) of the respective elements.

(10) The method for manufacturing electric resistance welded steel pipes or steel tubes described in any of (6) to (9), wherein the heat treatment for the electric resistance welded part includes heating the electric resistance welded part to a heating temperature of 720 to 1070° C., the heating temperature being an average of temperatures in the through-thickness direction of the welded part, and air cooling or water cooling the welded part, or further includes heating the electric resistance welded part to a heating temperature of less than 720° C., the heating temperature being an average of temperatures in the through-thickness direction of the welded part, and air cooling the welded part.

(11) The method for manufacturing electric resistance welded steel pipes or steel tubes described in any of (6) to (10), wherein the chemical composition further includes, by mass %, Ca: 0.0001 to 0.0040%.

(12) The method for manufacturing electric resistance welded steel pipes or steel tubes described in any of (6) to (11), wherein the chemical composition further includes, by mass %, Cr: 0.01 to 1.09%.

(13) The method for manufacturing electric resistance welded steel pipes or steel tubes described in any of (6) to (12), wherein the chemical composition further includes, by mass %, one or more selected from Cu: 0.01 to 0.35%, Mo: 0.01 to 0.25%, Ni: 0.01 to 0.20% and B: 0.0001 to 0.0030%.

(14) The method for manufacturing electric resistance welded steel pipes or steel tubes described in any of (6) to (13), wherein the chemical composition further includes, by mass %, one or more selected from Nb: 0.001 to 0.060%, V: 0.001 to 0.060% and Ti: 0.001 to 0.080%.

Advantageous Effects

The electric resistance welded parts formed according to embodiments exhibit excellent HIC resistance even in a severe corrosion environment. Further, the electric resistance welded parts according to embodiments have excellent low-temperature toughness such that the absorbed energy in a Charpy impact test at −60° C. is 120 J or more. The electric resistance welded steel pipes or steel tubes according to embodiments have a tensile strength TS of not less than 434 MPa. That is, the electric resistance welded steel pipes or steel tubes have excellent HIC resistance and low-temperature toughness, and also have sufficient strength. According to embodiments, electric resistance welded steel pipes or steel tubes having the above excellent properties may be manufactured easily. Thus, these embodiments have significant advantages in industry.

DETAILED DESCRIPTION

Figure 1:
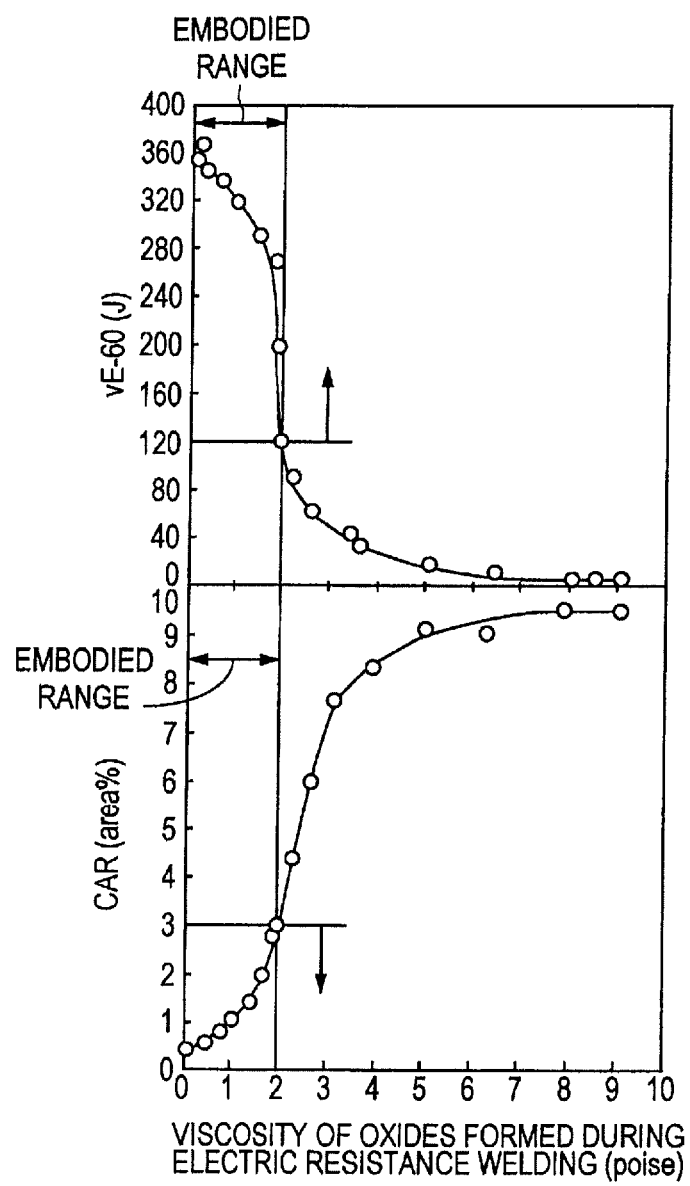
FIG. 1 is a graph illustrating an influence of the viscosity of oxides formed during electric resistance welding on the CAR of electric resistance welded parts and $vE_{-60}$ of electric resistance welded parts.
Figure 2:
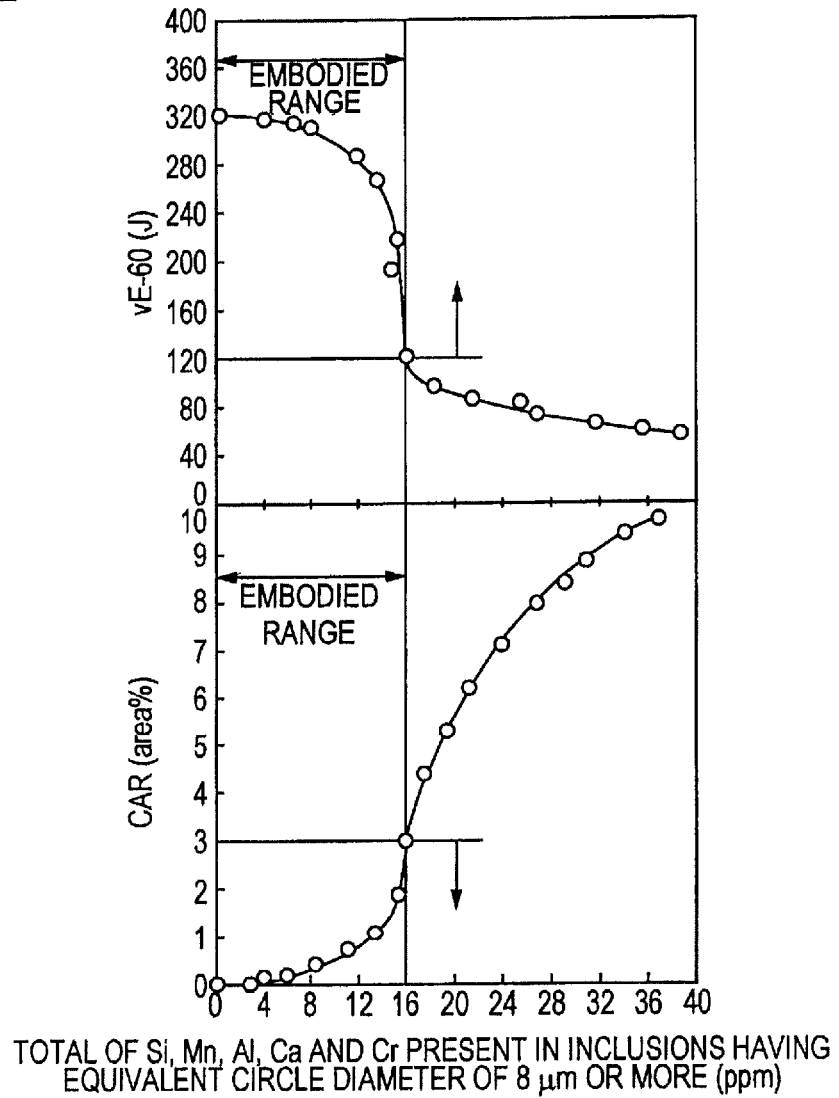
FIG. 2 is a graph illustrating how the CAR of electric resistance welded parts and $vE_{-60}$ of electric resistance welded parts are affected by the total content of silicon, manganese, aluminum, calcium and chromium present in inclusions having an equivalent circle diameter of 8 µm or more.

First, there will be described the reasons why the chemical composition of the electric resistance welded steel pipes or steel tubes according to embodiments is important. Hereinbelow, mass % is written simply as % unless otherwise mentioned.

C: 0.03 to 0.59%

Carbon is an element that increases the strength of steel pipes or tubes by forming hard phases such as pearlite, cementite, bainite and martensite. In order to ensure the desired strength (tensile strength of 434 MPa or more), the C content is preferably not less than 0.03%. Further, carbon decreases the melting point of liquid steel during electric resistance welding. Furthermore, carbon affects the formation of oxides during electric resistance welding by forming CO through the reaction with $O_2$ in the air. If the C content exceeds 0.59%, the liquid steel in electric resistance welded parts comes to exhibit a low solidification temperature in association with the decrease in melting point and consequently the viscosity of the liquid steel is increased, making it difficult for oxides to be squeezed out from the welded parts. For these reasons, the C content is limited to the range of 0.03 to 0.59%, and is preferably 0.04 to 0.49%.

Si: 0.10 to 0.50%

Silicon is an element that increases the strength of steel pipes or tubes by solute strengthening. Further, silicon exhibits higher affinity for oxygen (O) than iron in electric resistance welded parts to form highly viscous eutectic oxides with manganese oxide. If the Si content is less than 0.10%, the Mn concentration in the eutectic oxides in electric resistance welded parts is so increased that the melting point of the oxides is increased to above the liquid steel temperature, thus increasing the chance for the oxides to remain in the electric resistance welded parts. As a result, inclusions found in the electric resistance welded parts are likely to be such that the total of silicon, manganese, aluminum, calcium and chromium present in inclusions having an equivalent circle diameter of 8 μm or more exceeds 16 ppm to cause deteriorations in the toughness and the HIC resistance of the electric resistance welded parts. On the other hand, any Si content exceeding 0.50% leads to an increase in the Si concentration in the eutectic oxides in electric resistance welded parts, and increases viscosity and the amount of oxides formed, thus increasing the chance for the oxides to remain in the electric resistance welded parts. As a result, inclusions found in the electric resistance welded parts are likely to be such that the total of silicon, manganese, aluminum, calcium and chromium present in inclusions having an equivalent circle diameter of 8 μm or more exceeds 16 ppm to cause deteriorations in the toughness and the HIC resistance of the electric resistance welded parts. For these reasons, the Si content is limited to the range of 0.10 to 0.50%, and is preferably 0.15 to 0.35%.

Mn: 0.40 to 2.10%

Manganese is an element that contributes to increasing the strength of steel pipes or tubes by solute strengthening and transformation toughening. Further, manganese exhibits higher affinity for oxygen than iron in electric resistance welded parts to form highly viscous eutectic oxides with silicon oxide. If the Mn content is less than 0.40%, the Si concentration in the eutectic oxides in electric resistance welded parts is so increased that the melting point of the oxides is increased to above the liquid steel temperature and also the viscosity is increased, thus increasing the chance for the oxides to remain in the electric resistance welded parts. As a result, inclusions found in the electric resistance welded parts are likely to be such that the total of such elements as silicon, manganese, aluminum and calcium present in inclusions having an equivalent circle diameter of 8 μm or more exceeds 16 ppm to cause deteriorations in the toughness and the HIC resistance of the electric resistance welded parts. If, on the other hand, the Mn content exceeds 2.10%, the Mn concentration in the eutectic oxides in electric resistance welded parts is so increased that the melting point of the oxides is increased to above the liquid steel temperature, and the oxides are formed in an increased amount and tend to remain in the electric resistance welded parts. As a result, the total of such elements as silicon, manganese, aluminum and calcium present in inclusions having an equivalent circle diameter of 8 μm or more tends to exceed 16 ppm to cause deteriorations in the toughness and the HIC resistance of the electric resistance welded parts. For these reasons, the Mn content is limited to the range of 0.40 to 2.10%, and is preferably 0.85 to 1.65%.

In the electric resistance welded steel pipes or steel tubes according to embodiments, silicon and manganese are contained in the aforementioned ranges and also satisfy Mn/Si in the range of 6.0 to 9.0. Mn/Si is a mass ratio (Mn content/Si content).

The oxides formed during electric resistance welding are silicon-manganese oxides. Thus, regulating Mn/Si to the specific range is an important factor to control the viscosity of the oxides to or below the specific level. If Mn/Si is less than 6.0, the Si content is so high that a large amount of molten silicate having a network structure is formed to make it impossible to control the viscosity of oxides formed during electric resistance welding to 2 poise or less. If, on the other hand, Mn/Si exceeds 9.0, the Mn content is so large that the melting point of the oxides is increased to above the liquid steel temperature. As a result, inclusions found in the electric resistance welded parts will be such that the total of silicon, manganese, aluminum, calcium and chromium present in inclusions having an equivalent circle diameter of 8 μm or more exceeds 16 ppm. Thus, the Si content and the Mn content are controlled to satisfy Mn/Si in the range of 6.0 to 9.0. The ratio is preferably 6.2 to 8.8.

Al: 0.01 to 0.35%

Aluminum is an element that serves as a deoxidizing agent. Further, aluminum is precipitated in the form of AlN to suppress the growth of austenite grains, thus contributing to ensuring toughness. Furthermore, aluminum exhibits higher affinity for oxygen (O) than silicon or manganese, and forms an oxide in the form of a solute in the manganese-silicon eutectic oxides such as $2MnO \cdot SiO_2$ (tephroite). Any Al content of less than 0.01% leads to insufficient deoxidation ability and decreases the cleanness of steel, thus increasing the chance for the inclusions (oxides) to remain in the electric resistance welded parts. As a result, inclusions found in the electric resistance welded parts are likely to be such that the total of such elements as silicon, manganese and aluminum present in inclusions having an equivalent circle diameter of 8 μm or more exceeds 16 ppm to cause deteriorations in the toughness and the HIC resistance of the electric resistance welded parts. If, on the other hand, the Al content exceeds 0.35%, the Al concentration in the eutectic oxides is increased and the melting point of the oxides is increased to above the liquid steel temperature, thus increasing the chance for the oxides to remain in the electric resistance welded parts. As a result, inclusions found in the electric resistance welded parts are likely to be such that the total of such elements as silicon, manganese and aluminum present in inclusions having an equivalent circle diameter of 8 μm or more exceeds 16 ppm to cause deteriorations in the toughness and the HIC resistance of the electric resistance welded parts. For these reasons, the Al content is limited to the range of 0.01 to 0.35%, and is preferably 0.03 to 0.08%.

The components described above are basic components. In addition to these basic components, the electric resistance welded steel pipes or steel tubes according to embodiments may further include Ca: 0.0001 to 0.0040%, and/or Cr: 0.01 to 1.09%, and/or one or more selected from Cu: 0.01 to 0.35%, Mo: 0.01 to 0.25%, Ni: 0.01 to 0.20% and B: 0.0001 to 0.0030%, and/or one or more selected from Nb: 0.001 to 0.060%, V: 0.001 to 0.060% and Ti: 0.001 to 0.080%.

Ca: 0.0001 to 0.0040%

Calcium has an effect of morphologically controlling the shape of sulfides in steel to spherical forms, and enhances the hydrogen embrittlement resistance and the toughness of steel pipes or tubes near electric resistance welded parts. These effects may be obtained when the Ca content is 0.0001% or more. Because calcium has high affinity for oxygen, any Ca content exceeding 0.0040% leads to results in which the Ca concentration in the oxides is increased, the melting point of the oxides is increased to above the liquid steel temperature, and the amount of oxides formed is increased, thus increasing the chance for the oxides to remain in the electric resistance welded parts. As a result, inclusions found in the electric resistance welded parts are likely to be such that the total of such elements as silicon, manganese, aluminum and calcium present in inclusions having an equivalent circle diameter of 8 μm or more exceeds 16 ppm to cause deteriorations in the toughness and the HIC resistance of the electric resistance welded parts. For these reasons, the content of calcium, when contained, is preferably limited to the range of 0.0001 to 0.0040%, and is more preferably 0.0002 to 0.0035%.

Cr: 0.01 to 1.09%

Similarly to manganese, chromium is an element that contributes to increasing the strength of steel pipes or tubes by solute strengthening and transformation toughening. Further, chromium forms oxides in electric resistance welded parts by exhibiting higher affinity for oxygen (O) than iron. These effects may be obtained when the Cr content is 0.01% or more. Any Cr content exceeding 1.09% leads to results in which the Cr concentration in the oxides is increased, the melting point of the oxides is increased to above the liquid steel temperature, and the amount of oxides formed is increased, thus increasing the chance for the oxides to remain in the electric resistance welded parts. As a result, inclusions found in the electric resistance welded parts are likely to be such that the total of such elements as silicon, manganese, aluminum and chromium present in inclusions having an equivalent circle diameter of 8 μm or more exceeds 16 ppm to cause deteriorations in the toughness and the HIC resistance of the electric resistance welded parts. For these reasons, the content of chromium, when contained, is preferably limited to the range of 0.01 to 1.09%, and is more preferably 0.02 to 0.99%.

One or More Selected from Cu: 0.01 to 0.35%, Mo: 0.01 to 0.25%, Ni: 0.01 to 0.20% and B: 0.0001 to 0.0030%

Copper, molybdenum, nickel and boron are elements which may be added to enhance hydrogen embrittlement resistance and to increase the strength of steel pipes or tubes. The strength of steel pipes or tubes indicates tensile strength TS and yield stress YS. The electric resistance welded steel pipes or steel tubes according to embodiments may contain these elements as required. The above effects become marked when the steel contains any of 0.01% or more copper, 0.01% or more molybdenum, 0.01% or more nickel and 0.0001% or more boron. If, on the other hand, the steel contains any of more than 0.35% copper, more than 0.25% molybdenum, more than 0.25% nickel and more than 0.0030% boron, the effects obtained by the addition of the above elements are saturated, and the addition of these elements cannot be expected to provide appropriate results and will instead cause economic disadvantages. For these reasons, the contents of the above elements, when contained, are preferably limited to the ranges of 0.01 to 0.35% for copper, 0.01 to 0.25% for molybdenum, 0.01 to 0.20% for nickel, and 0.0001 to 0.0030% for boron. More preferably, the Cu content is 0.05 to 0.29%, the Mo content is 0.05 to 0.21%, the Ni content is 0.02 to 0.16%, and the B content is 0.0005 to 0.0020%.

One or More Selected from Nb: 0.001 to 0.060%, V: 0.001 to 0.060% and Ti: 0.001 to 0.080%

Niobium, vanadium and titanium are elements that mainly form carbides and increase the strength of steel pipes or tubes by precipitation strengthening. The electric resistance welded steel pipes or steel tubes according to embodiments may contain these elements as required. The above effects become marked when the steel contains any of 0.001% or more niobium, 0.001% or more vanadium and 0.001% or more titanium. If, on the other hand, the steel contains any of more than 0.060% niobium, more than 0.060% vanadium and more than 0.080% titanium, large undissolved carbonitrides remain in the electric resistance welded parts to lower the toughness of the electric resistance welded parts. Thus, the contents of the above elements, when contained, are preferably limited to the ranges of 0.001 to 0.060% for niobium, 0.001 to 0.060% for vanadium, and 0.001 to 0.080% for titanium. More preferably, the Nb content is 0.005 to 0.050%, the V content is 0.005 to 0.050%, and the Ti content is 0.005 to 0.040%.

The balance is iron and inevitable impurities. Some of the acceptable inevitable impurities are P: not more than 0.020%, S: not more than 0.005%, N: not more than 0.005% and O: not more than 0.003%.

The electric resistance welded steel pipes or steel tubes according to embodiments have the aforementioned chemical composition, exhibit a tensile strength TS of not less than 434 MPa, and include an electric resistance welded part containing inclusions in which the total amount of silicon, manganese, aluminum, calcium and chromium present in inclusions having an equivalent circle diameter of 8 μm or more is not more than 16 ppm in terms of mass % relative to the total mass of the electric resistance welded part including base iron.

In the electric resistance welded part of the electric resistance welded steel pipe or steel tube according to embodiments, the viscosity of oxides formed during electric resistance welding is low and the melting point of the oxides is not more than the liquid steel temperature. The electric resistance welded part is such that inclusions found in the electric resistance welded part which have an equivalent circle diameter of 8 μm or more contain silicon, manganese, aluminum, calcium and chromium in a total amount of not more than 16 ppm. If the total amount of silicon, manganese, aluminum, calcium and chromium present in inclusions having an equivalent circle diameter of 8 μm or more exceeds 16 ppm, the electric resistance welded part shows deteriorations in HIC resistance and low-temperature toughness.

The total amount of silicon, manganese, aluminum, calcium and chromium present in inclusions in the electric resistance welded part having an equivalent circle diameter of 8 μm or more is a value obtained in the following manner. A plate specimen for electrolytic extraction having a width of 2 mm was sampled from the electric resistance welded steel pipe or steel tube so that the electric resistance welded part would be located in the center of the specimen. The specimen was soaked in a 10% AA liquid as an electrolytic solution to electrolytically extract inclusions from the specimen. The electrolytic extract (inclusions) obtained was filtered through a filter having a mesh size of 8 μm. The electrolytic extract that had been filtered (inclusions having an equivalent circle diameter of 8 μm or more) was subjected to alkali fusion and was analyzed by inductively coupled plasma (ICP) analysis to determine silicon, manganese, aluminum, calcium and chromium present in the inclusions. By this analysis, the total content of silicon, manganese, aluminum, calcium and chromium in the inclusions having an equivalent circle diameter of 8 μm or more was obtained. The contents of any of these elements that are not present in the electric resistance welded steel pipe or steel tube are calculated as zero.

Next, there will be described a method for manufacturing electric resistance welded steel pipes or steel tubes according to another embodiment.

A steel material (slab) having the aforementioned chemical composition is heated and hot rolled into a steel strip (hot rolled steel strip) with a prescribed thickness, which is then slit to a prescribed width. In embodiments, the thus-obtained steel strip is continuously roll formed into an approximately cylindrical open pipe or tube. Further, the open pipe or tube is welded by electric resistance welding in which regions of the open pipe or tube including butt parts are heated to or above the melting point and the pipe or tube is upset with a squeeze roll to form an electric resistance welded part, thereby producing an electric resistance welded steel pipe or steel tube.

The roll forming is preferably performed by a cage roll forming process. A cage roll forming process is a process of roll forming in which the outer surface of a pipe or tube is formed smoothly on a series of small rolls called cage rolls. Of the cage roll forming processes, a chance-free bulge roll (CBR) forming process is preferable. In the CBR forming process, both edges of a steel strip are formed first on edge bending rolls, and a central portion of the steel strip is then bent on center bending rolls and cage rolls to form a long oval pipe or tube. Subsequently, four regions in a circumferential direction of the pipe are overbent by fin pass rolling, and the pipe is subjected to reducing rolling which performs the stretch forming of side regions of the pipe as well as the bend and return forming of the overbent regions, thereby forming a circular pipe or tube (see KAWASAKI STEEL GIHO Vol. 32 (2,000), pp. 49 to 53). This forming process can minimally reduce the strain applied to the sheet (steel strip) during forming, and can suppress deteriorations in material characteristics due to work hardening. The roll forming may be performed by a break-down method.

In embodiments, it is preferable that the steel strip be continuously roll formed into an approximately cylindrical open pipe or tube in such a manner that tapered grooves (grooves having a tapered shape) are formed in edges on both sides in the width direction of the hot rolled steel strip. The grooves are preferably formed in edges in the width direction of the steel strip by the use of fin pass rolls in the roll forming. The tapered grooves are preferably formed such that the total of a distance (indicated by a in FIG. 3) in the through-thickness direction of the hot rolled steel strip between a starting location of the taper and a surface defining an outer surface of the pipe (an ending location of the taper on the outer surface side of the pipe), and a distance (indicated by b in FIG. 3) in the through-thickness direction of the hot rolled steel strip between a starting location of the taper and a surface defining an inner surface of the pipe (an ending location of the taper on the inner surface side of the pipe) is 2 to 80% of the thickness of the hot rolled steel strip (the steel strip thickness).

When 2 to 80% of the steel strip thickness is represented by the total (a+b in FIG. 3) of the distance (indicated by a in FIG. 3) in the through-thickness direction of the hot rolled steel strip between a taper starting location and a surface defining the outer surface of the pipe and the distance (indicated by b in FIG. 3) in the through-thickness direction of the hot rolled steel strip between a taper starting location and a surface defining the inner surface of the pipe, the over heating of outer and inner edges of the steel strip is suppressed and the oxides formed before electric resistance welding are caused to flow and be squeezed in upward and downward directions in the steel strip by upsetting. Consequently, as compared to when there are no tapers, the total amount in ppm by mass of such elements as silicon, manganese and aluminum present in inclusions in the electric resistance welded part having an equivalent circle diameter of 8 μm or more is decreased by approximately 5 ppm relative to the total mass of a 2 mm wide portion of the electric resistance welded part including base iron.

Figure 3:
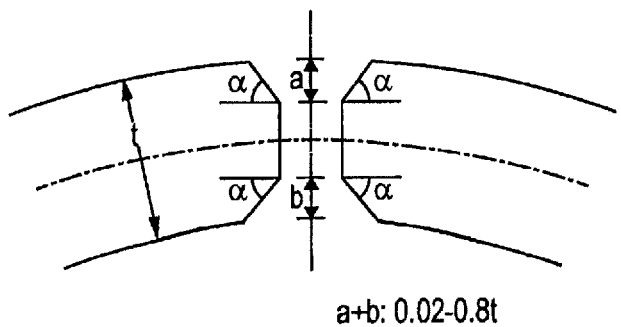
FIG. 3 is a view illustrating a preferred example of the shapes of grooves.

For example, the shape of the grooves may be preferably a shape illustrated as an example in FIG. 3, which is designed in association with the oxidization tendency $f_{oxy}$ defined by Equation (1) below.

$$f_{oxy}=Mn+10(Si+Cr)+100Al+1000Ca \quad (1)$$

(Here, Mn, Si, Cr, Al and Ca are the contents (mass %) of the respective elements.)

The average tilt angle α (°) in FIG. 3 preferably satisfies the relation (2) below in association with the oxidization tendency $f_{oxy}$ of liquid steel.

$$10\times\log(f_{oxy})\leq\alpha\leq40\times\log(f_{oxy}) \quad (2)$$

Designing the tapers so as to have an average tilt angle α in this range ensures that the over heating of edges of the steel strip is suppressed and the inclusions (oxides) that have been formed are squeezed out in upward and downward directions in the steel strip by upsetting. Consequently, the total amount of such elements as silicon, manganese and aluminum present in inclusions in the electric resistance welded part having an equivalent circle diameter of 8 μm or more is decreased to 16 ppm or less. If the average tilt angle α fails to satisfy the relation (2), the tapers produce small effects in promoting the squeezing out of oxides. The tapers are not limited to linear shapes, and may be any curved shapes.

In order to control the viscosity of oxides formed during electric resistance welding to 2 poise or less, electric resistance welding in embodiments is performed while controlling the concentration of oxygen in the atmosphere during the electric resistance welding and/or while controlling the time from the onset of melting by the heating in the electric resistance welding to the upsetting.

When the controlling controls the concentration of oxygen in the atmosphere during the electric resistance welding, the concentration of oxygen is adjusted to or below $1000/f_{oxy}$ ppm by volume in association with the oxidization tendency $f_{oxy}$ of liquid steel defined by Equation (1) below.

$$f_{oxy} = Mn + 10(Si+Cr) + 100Al + 1000Ca \quad (1)$$

(Here, Mn, Si, Cr, Al and Ca are the contents (mass %) of the respective elements.)

The concentration of oxygen in the atmosphere during the electric resistance welding may be decreased by any method without limitation. For example, the electric resistance welded part may be isolated by sealing with a box structure in which a non-oxidizing gas is supplied. In order to maintain the concentration of oxygen in the atmosphere to a low level, it is important that the non-oxidizing gas be supplied in the form of a laminar airflow through a nozzle having a multilayer structure such as a three-layer structure. The concentration of oxygen is preferably measured with an oxygen meter near the electric resistance welded part. If the concentration in volume ratio of oxygen in the atmosphere during the electric resistance welding exceeds ($1000/f_{oxy}$) ppm, a large amount of oxides is formed during the electric resistance welding and the total content of silicon, manganese, aluminum, calcium and chromium present in inclusions in the electric resistance welded part having an equivalent circle diameter of 8 μm or less exceeds 16 ppm to cause deteriorations in HIC resistance and low-temperature toughness. Thus, the concentration in volume ratio of oxygen in the atmosphere during the electric resistance welding is controlled to or below ($1000/f_{oxy}$) ppm.

Disclosed embodiments may involve controlling of the time from the onset of melting by the heating in the electric resistance welding to the upsetting. In this case, the time is preferably 0.2 to 4 seconds between when edges in the width direction of the steel strip start to melt and when they are upset. If the time is less than 0.2 seconds between the onset of melting by the heating in the electric resistance welding and the upsetting, the liquid steel temperature is still low and the viscosity of oxides does not reach 2 poise or less, and consequently the oxides that have been formed tend to remain in the electric resistance welded part. If, on the other hand, the time is longer than 4 seconds between the onset of melting by the heating in the electric resistance welding and the upsetting, a large amount of oxides is formed and further the amount of molten silicate in the oxides is increased, and consequently the oxides that have been formed tend to remain in the electric resistance welded part. For these reasons, the time from the onset of melting by the heating in the electric resistance welding to the upsetting is preferably controlled to the range of 0.2 to 4 seconds. The viscosity of oxides formed during electric resistance welding is more preferably 1 poise or less. The time from the onset of melting by the heating in the electric resistance welding to the upsetting may be 0.4 to 3 seconds.

The electric resistance welded part of the electric resistance welded steel pipe or steel tube obtained by the aforementioned method is subsequently subjected to online heat treatment.

The toughness of electric resistance welded parts is affected by inclusions (oxides) present in the electric resistance welded parts, and also by the base phase (base metal). In embodiments, the heat treatment after the electric resistance welding is preferably online heat treatment (heating-cooling treatment) in which the electric resistance welded part is heated to an average temperature in the through-thickness direction of the electric resistance welded part of 720 to 1070° C. and is thereafter air cooled or water cooled to a temperature of 500° C. or below. The online heat treatment may be performed by any method without limitation. Induction heating is preferable. The heat treatment enhances the low-temperature toughness of the electric resistance welded parts. If the heating temperature is less than 720° C., a quenched structure (a hard structure) formed during the electric resistance welding is allowed to remain and thus the enhancement in low-temperature toughness is small. On the other hand, heating to a temperature exceeding 1070° C. causes the coarsening of grains and results in a deterioration in low-temperature toughness. In the heat treatment, the average heating temperature in the through-thickness direction is preferably 770 to 1020° C.

In addition to the above heat treatment, tempering treatment (heat treatment: heating-cooling treatment) may be performed in which the welded part is heated to a temperature of less than 720° C. and is air cooled. By the tempering treatment (heating-cooling treatment), the low-temperature toughness of the electric resistance welded part is further enhanced.

Disclosed embodiments will be further described below based on the following Examples.

EXAMPLES

Steel materials (slabs: 250 mm in thickness) having chemical compositions shown in Table 1 were heated to 1260° C. and soaked for 90 minutes, and were thereafter rough rolled and finish rolled at a finish rolling temperature of 850° C. and a coiling temperature of 580° C., thereby producing hot rolled steel strips (thickness: 19.1 mm).

The hot rolled steel strips were slit to a prescribed width and were continuously roll formed under conditions described in Table 2 to form approximately cylindrical open pipes. Under conditions described in Table 2, the open pipes were welded by electric resistance welding in which regions of the open pipes including butt parts were heated at least to the melting point and were upset with squeeze rolls to form electric resistance welded parts. In this manner, electric resistance welded steel pipes or steel tubes (outer diameter: 304.8 mmφ) were obtained.

During the roll forming, tapers with an average tilt angle α° described in Table 2 were formed on the outer surface side and the inner surface side with use of fin pass rolls. The ratios of the heights of the tapers on the outer surface side and the inner surface side were each 20 to 40% relative to the total thickness (the height on the outer surface side corresponds to "a" in FIG. 3, and the height on the inner surface side corresponds to "b" in FIG. 3). Some of the electric resistance welded steel pipes or steel tubes were not provided with tapers.

In some cases, the electric resistance welding involved controlling of the atmosphere in which the concentration in volume ratio of oxygen in the atmosphere during the electric resistance welding was decreased to 30 to 65 ppm by blowing $N_2$ gas through a nozzle having three nozzle openings. In the other cases, electric resistance welded steel pipes or steel tubes were manufactured in an air atmosphere. The concentration of oxygen in the electric resistance welded parts was measured with an oxygen meter by bringing its probe close to the electric resistance welded part.

After the electric resistance welding, the electric resistance welded parts were subjected to heating-cooling treatment (heat treatment) (seam QT) with an online radio-frequency heating apparatus under conditions described in Table 2. The cooling was water cooling. In some cases, the electric resistance welded parts were further subjected to heating-cooling treatment (heat treatment: tempering treatment) in which the welded parts were further heated to 500° C. with an online radio-frequency heating apparatus and were cooled by air cooling.

The viscosity of oxides formed during the electric resistance welding (temperature: 1550° C.) was obtained based on the chemical compositions of oxides formed during the electric resistance welding and by using Equation (1), the results being described in Table 2.

Figure 4:
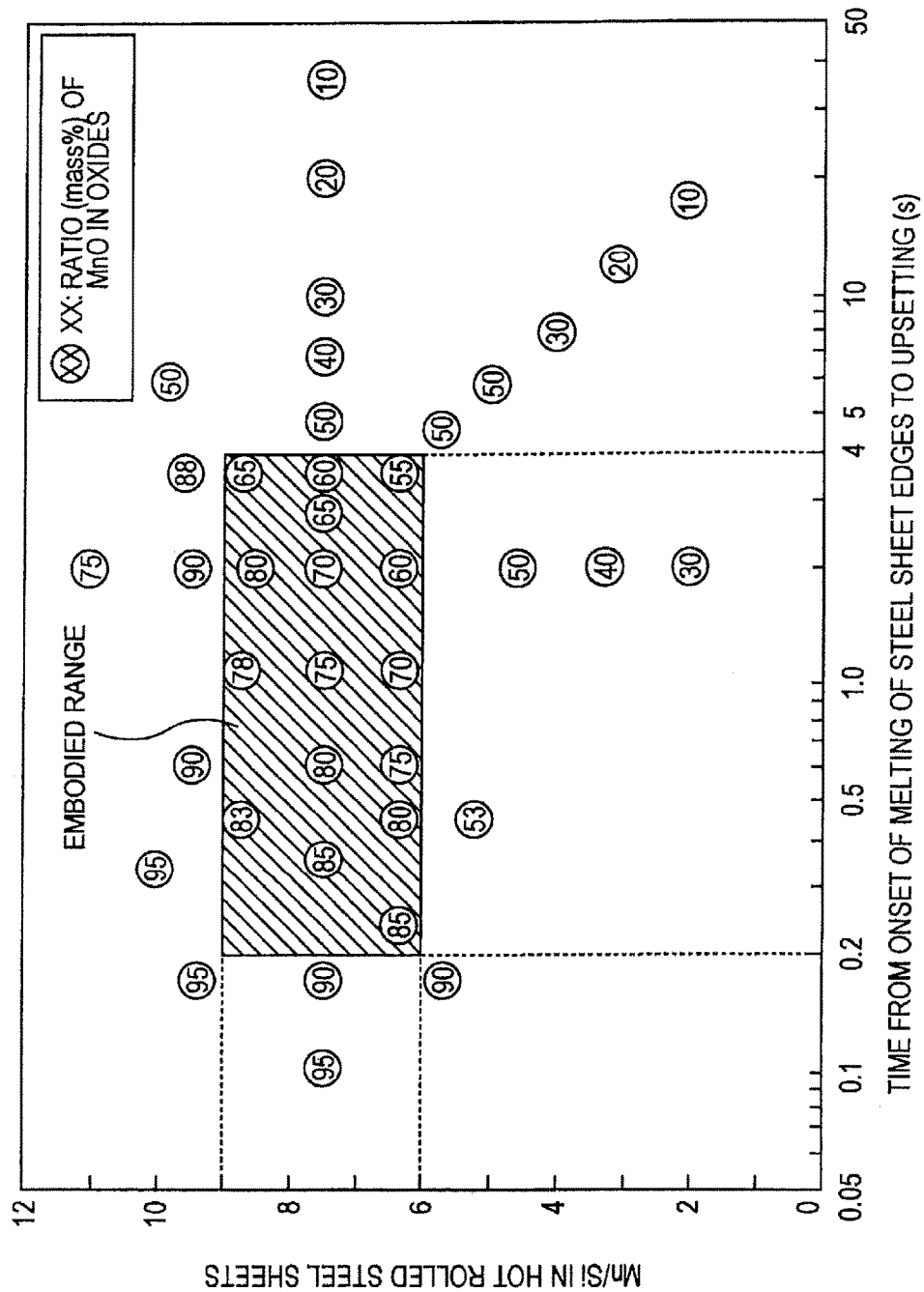
FIG. 4 is a graph illustrating relationships between Mn/Si in hot rolled steel sheets that affects the chemical compositions of oxides formed during electric resistance welding, and the time from the melting of steel sheet edges to upsetting.

FIG. 4 illustrates relationships between the chemical composition (Mn/Si) of hot rolled steel sheets that will affect the chemical compositions of oxides, and the time from the onset of melting of steel sheet edges to the upsetting.

With respect to the electric resistance welded steel pipes or steel tubes, the electric resistance welded parts were analyzed first to determine the total amount of silicon, manganese, aluminum, calcium and chromium present in inclusions having an equivalent circle diameter of 8 μm or more. Further, tensile test pieces were sampled from base metal portions of the electric resistance welded steel pipes or steel tubes, and a tensile test was performed to determine the tensile properties (yield strength YS and tensile strength TS) of the base metals. Furthermore, test pieces were sampled from the electric resistance welded parts of the electric resistance welded steel pipes or steel tubes, and were tested to evaluate the HIC resistance, the low-temperature toughness and the fracture toughness of the electric resistance welded parts. The testing methods were as follows.

(1) Measurement of Total Amount of Silicon, Manganese, Aluminum, Calcium and Chromium Present in Inclusions in Electric Resistance Welded Part Having Equivalent Circle Diameter of 8 μm or More A plate specimen for electrolytic extraction having a width of 2 mm was sampled from the electric resistance welded steel pipe or steel tube so that the electric resistance welded part would be located in the center of the specimen. The plate specimen was electrolyzed in a 10% AA liquid to electrolytically extract inclusions. The electrolytic extract (inclusions) obtained was filtered through a filter having a mesh size of 8 μm or less. The electrolytic extract that had been filtered (inclusions having an equivalent circle diameter of 8 μm or more) was subjected to alkali fusion and was analyzed by ICP analysis to determine silicon, manganese, aluminum, calcium and chromium present in the inclusions. The total content of these elements, namely, silicon, manganese, aluminum, calcium and chromium in the inclusions having an equivalent circle diameter of 8 μm or more was expressed in mass % relative to the total mass of the electric resistance welded part including base iron. The contents of any of these elements that were not present in the electric resistance welded steel pipe or steel tube were calculated as zero.

(2) Tensile Test

In accordance with JIS Z 2201, JIS No. 12C test pieces (arcuate tensile test pieces) were sampled from base metal portions of the electric resistance welded steel pipes or steel tubes so that the direction of tube axis would be the tensile direction. A tensile test was carried out in accordance with JIS Z 2241 to determine tensile properties (yield strength YS and tensile strength TS).

(3) Charpy Impact Test

In accordance with JIS Z 2242, Charpy impact test pieces (V notch test pieces: subsize test pieces having the thickness of the tubes) were sampled from the electric resistance welded steel pipes or steel tubes in both circumferential directions starting from the electric resistance welded part. The presence of a notch was confirmed by etching, and the electric resistance welded part was located in the center. The Charpy impact test pieces (the V notch test pieces) were subjected to an impact test to measure the absorbed energy. The testing temperature was −60° C., and three test pieces were tested. The arithmetic average was obtained as the absorbed energy of the electric resistance welded part of the electric resistance welded steel pipe or steel tube.

(4) CTOD Test

In accordance with WES 1108 (1995), CTOD test pieces were sampled from the electric resistance welded parts of the electric resistance welded steel pipes or steel tubes. A fatigue precrack was introduced to the center of the electric resistance welded parts, and a three-point bending test was performed at a testing temperature of −20° C. Values of crack tip opening displacement (CTOD) to the occurrence of a brittle crack were measured to evaluate the fracture toughness of the electric resistance welded parts.

(5) HIC Resistance Test

HIC test pieces (size: 10 mm in thickness×20 mm in width×100 mm in length) were sampled from the electric resistance welded parts of the electric resistance welded steel pipes or steel tubes in such a manner that the direction of the length of the test pieces would be the direction of tube axis and a longitudinal cross section of the electric resistance welded part would be at the center in the width direction of the test piece. The test pieces were subjected to an HIC test. The HIC test was performed by soaking the test pieces in NACE TM0284 Solution A (0.5% $CH_3COOH$+5% NaCl+ saturated $H_2S$) for 200 hours. After the soaking, the longitudinal cross section of the electric resistance welded parts was analyzed by ultrasonic flaw detection, and the crack area ratio (CAR) was obtained by image treatment.

The results are described in Table 3.

TABLE 1

| Steel No. | Chemical composition (mass %) | | | | | | | | | | | | Mn/Si | $f_{oxy}$* |
|---|---|---|---|---|---|---|---|---|---|---|---|---|---|---|
| | C | Si | Mn | P | S | N | Al | O | Ca | Cr | Cu, Ni, Mo, B | Nb, Ti, V | | |
| A | 0.040 | 0.15 | 1.23 | 0.006 | 0.0004 | 0.0030 | 0.021 | 0.0012 | 0.0021 | 0 | Mo: 0.12 | Nb: 0.036<br>Ti: 0.015<br>V: 0.035 | 8.20 | 6.9 |
| B | 0.063 | 0.15 | 0.94 | 0.008 | 0.002 | 0.0032 | 0.024 | 0.0007 | 0.0031 | 0.84 | Cu: 0.14 | | 6.27 | 16.3 |
| C | 0.036 | 0.20 | 1.75 | 0.005 | 0.0012 | 0.0025 | 0.036 | 0.0012 | 0.0023 | 0 | Cu0.20<br>Ni: 0.14<br>Mo: 0.15 | Nb: 0.052<br>Ti: 0.014<br>V: 0.032 | 8.75 | 9.7 |
| D | 0.041 | 0.15 | 1.01 | 0.004 | 0.0006 | 0.0027 | 0.030 | 0.0012 | 0.0019 | 0 | Mo: 0.15 | Nb: 0.052<br>Ti: 0.012<br>V: 0.052 | 6.73 | 7.4 |
| E | 0.090 | 0.16 | 1.33 | 0.011 | 0.002 | 0.0038 | 0.036 | 0.0006 | 0.0023 | 0.02 | B: 0.0012 | Ti: 0.021 | 8.31 | 9.0 |
| F | 0.024 | 0.27 | 1.44 | 0.014 | 0.008 | 0.0014 | 0.063 | 0.0018 | 0 | 0 | | | 5.33 | 10.4 |
| G | 0.650 | 0.36 | 1.74 | 0.011 | 0.0008 | 0.0031 | 0.026 | 0.0012 | 0 | 0 | | | 4.83 | 7.9 |

TABLE 1-continued

| Steel No. | Chemical composition (mass %) | | | | | | | | | | | | | |
|---|---|---|---|---|---|---|---|---|---|---|---|---|---|---|
| | C | Si | Mn | P | S | N | Al | O | Ca | Cr | Cu, Ni, Mo, B | Nb, Ti, V | Mn/Si | $f_{oxy}$* |
| H | 0.125 | 0.001 | 1.52 | 0.016 | 0.002 | 0.0030 | 0.074 | 0.0012 | 0 | 0.22 | | | 1520 | 11.1 |
| I | 0.059 | 1.65 | 1.58 | 0.005 | 0.002 | 0.0036 | 0.038 | 0.0044 | 0 | 0.25 | | | 0.96 | 24.4 |
| J | 0.098 | 0.44 | 0.35 | 0.017 | 0.005 | 0.0018 | 0.049 | 0.0007 | 0.0021 | 0.06 | | | 0.80 | 12.4 |
| K | 0.116 | 0.35 | 2.35 | 0.012 | 0.003 | 0.0033 | 0.021 | 0.0015 | 0.0019 | 0.07 | | | 6.71 | 10.6 |
| L | 0.081 | 0.26 | 1.28 | 0.019 | 0.006 | 0.0032 | 0.003 | 0.0011 | 0.0011 | 0.05 | | | 4.92 | 5.8 |
| M | 0.108 | 0.19 | 1.44 | 0.012 | 0.002 | 0.0039 | 0.450 | 0.0022 | 0.0009 | 0.06 | | | 7.58 | 49.8 |
| N | 0.076 | 0.44 | 1.35 | 0.018 | 0.0009 | 0.0019 | 0.024 | 0.0006 | 0 | 1.25 | | | 3.07 | 20.7 |
| O | 0.089 | 0.30 | 1.53 | 0.009 | 0.003 | 0.0039 | 0.042 | 0.0024 | 0.0058 | 0.07 | | | 5.10 | 15.2 |
| P | 0.420 | 0.18 | 1.35 | 0.008 | 0.0005 | 0.0032 | 0.043 | 0.0012 | 0 | 0 | | | 7.50 | 7.5 |
| Q | 0.420 | 0.18 | 1.35 | 0.008 | 0.0005 | 0.0032 | 0.043 | 0.0012 | 0.0015 | 0 | | | 7.50 | 9.0 |
| R | 0.420 | 0.18 | 1.35 | 0.008 | 0.0005 | 0.0032 | 0.043 | 0.0012 | 0 | 0.18 | | | 7.50 | 9.3 |

*$f_{oxy}$ = Mn + 10(Si + Cr) + 100Al + 1000Ca $\cdots$ (1)

TABLE 2

| Electric resistance welded steel pipe or steel tube No. | Steel No. | Shape of grooves in edges in width direction | | | Atmosphere during electric resistance welding | | | |
|---|---|---|---|---|---|---|---|---|
| | | Average tilt angle α (°) | Distance of taper in through-thickness direction/thickness (%) | | Oxygen concentration (ppm (mass %)) | Number of gas nozzles (nozzles) | 1000/$f_{oxy}$ | Evaluations* |
| | | | Outer surface side | Inner surface side | | | | |
| 1 | A | — | — | — | —** | — | 144 | — |
| 2 | A | — | — | — | —** | — | | — |
| 3 | A | 30 | 30 | 30 | —** | — | | — |
| 4 | A | 30 | 30 | 30 | —** | — | | — |
| 5 | A | — | — | — | 30 | 3 | | ○ |
| 6 | B | — | — | — | —** | — | 61 | — |
| 7 | B | — | — | — | —** | — | | — |
| 8 | B | — | — | — | —** | — | | — |
| 9 | B | 25 | 35 | 35 | —** | — | | — |
| 10 | B | — | — | — | 40 | 3 | | ○ |
| 11 | C | — | — | — | —** | — | 104 | — |
| 12 | C | — | — | — | —** | — | | — |
| 13 | C | — | — | — | —** | — | | — |
| 14 | C | 30 | 30 | 30 | —** | — | | — |
| 15 | C | — | — | — | 30 | 3 | | ○ |
| 16 | D | — | — | — | —** | — | 135 | — |
| 17 | D | — | — | — | —** | — | | — |
| 18 | D | — | — | — | —** | — | | — |
| 19 | D | 35 | 30 | 30 | —** | — | | — |
| 20 | D | — | — | — | 45 | 3 | | ○ |
| 21 | E | — | — | — | —** | — | 111 | — |
| 22 | E | — | — | — | —** | — | | — |
| 23 | E | 30 | 40 | 20 | —** | — | | — |
| 24 | E | 30 | 20 | 40 | —** | — | | — |
| 25 | E | — | — | — | 65 | 3 | | ○ |
| 26 | F | 30 | 30 | 30 | 30 | 3 | 96 | ○ |
| 27 | G | 30 | 30 | 30 | 30 | 3 | 126 | ○ |
| 28 | H | 30 | 30 | 30 | 30 | 3 | 90 | ○ |
| 29 | I | 30 | 30 | 30 | 30 | 3 | 41 | ○ |
| 30 | J | 30 | 30 | 30 | 30 | 3 | 81 | ○ |
| 31 | K | 30 | 30 | 30 | 30 | 3 | 95 | ○ |
| 32 | L | 30 | 30 | 30 | 30 | 3 | 173 | ○ |
| 33 | M | 30 | 30 | 30 | 30 | 3 | 20 | X |
| 34 | N | 30 | 30 | 30 | 30 | 3 | 48 | ○ |
| 35 | O | 30 | 30 | 30 | 30 | 3 | 66 | ○ |
| 36 | P | 30 | 30 | 30 | —** | — | 134 | — |
| 37 | Q | 30 | 30 | 30 | —** | — | 112 | — |
| 38 | R | 30 | 30 | 30 | —** | — | 108 | — |

| Electric resistance welded steel pipe or steel tube No. | Time from onset of heating to upsetting (s) | Viscosity of oxides formed during electric resistance welding (poise) | Heat treatment after electric resistance welding | | | Remarks |
|---|---|---|---|---|---|---|
| | | | Heating temp. (° C.) | Cooling after heating | Tempering temp. (° C.) | |
| 1 | 2.0 | 0.6 | 950 | Water cooling | | Inv. Ex. |
| 2 | 2.0 | 0.6 | 950 | Water cooling | 500 | Inv. Ex. |
| 3 | 2.0 | 0.6 | 950 | Water cooling | — | Inv. Ex. |
| 4 | 2.0 | 0.6 | 950 | Water cooling | 500 | Inv. Ex. |

TABLE 2-continued

| | | | | | | | |
|---|---|---|---|---|---|---|---|
| | 5 | 2.0 | 0.5 | 950 | Water cooling | — | Inv. Ex. |
| | 6 | 0.1 | 2.7 | 960 | Water cooling | 500 | Comp. Ex. |
| | 7 | 8.0 | 2.5 | 960 | Water cooling | 500 | Comp. Ex. |
| | 8 | 2.0 | 1.2 | 960 | Water cooling | 500 | Inv. Ex. |
| | 9 | 2.0 | 1.2 | 960 | Water cooling | 500 | Inv. Ex. |
| | 10 | 2.0 | 1.2 | 960 | Water cooling | 500 | Inv. Ex. |
| | 11 | 1.0 | 0.4 | 950 | Water cooling | 500 | Inv. Ex. |
| | 12 | 3.0 | 0.3 | 950 | Water cooling | — | Inv. Ex. |
| | 13 | 1.0 | 0.4 | 950 | Water cooling | 500 | Inv. Ex. |
| | 14 | 1.0 | 0.4 | 950 | Water cooling | 500 | Inv. Ex. |
| | 15 | 1.0 | 0.3 | 950 | Water cooling | 500 | Inv. Ex. |
| | 16 | 0.1 | 3.0 | 975 | Water cooling | — | Comp. Ex. |
| | 17 | 6.0 | 2.8 | 975 | Water cooling | — | Comp. Ex. |
| | 18 | 3.0 | 0.8 | 975 | Water cooling | | Inv. Ex. |
| | 19 | 3.0 | 0.8 | 975 | Water cooling | | Inv. Ex. |
| | 20 | 3.0 | 0.7 | 975 | Water cooling | — | Inv. Ex. |
| | 21 | 2.0 | 0.8 | 940 | Water cooling | — | Inv. Ex. |
| | 22 | 2.0 | 0.8 | 940 | Water cooling | 500 | Inv. Ex. |
| | 23 | 2.0 | 0.8 | 940 | Water cooling | | Inv. Ex. |
| | 24 | 2.0 | 0.8 | 940 | Water cooling | | Inv. Ex. |
| | 25 | 2.0 | 0.7 | 940 | Water cooling | — | Inv. Ex. |
| | 26 | 2.0 | 3.0 | 955 | Water cooling | 500 | Comp. Ex. |
| | 27 | 2.0 | 3.0 | 955 | Water cooling | 500 | Comp. Ex. |
| | 28 | 2.0 | 2.2 | 955 | Water cooling | 500 | Comp. Ex. |
| | 29 | 2.0 | 5.0 | 955 | Water cooling | 500 | Comp. Ex. |
| | 30 | 2.0 | 4.0 | 955 | Water cooling | 500 | Comp. Ex. |
| | 31 | 2.0 | 3.0 | 955 | Water cooling | 500 | Comp. Ex. |
| | 32 | 2.0 | 2.5 | 955 | Water cooling | 500 | Comp. Ex. |
| | 33 | 2.0 | 2.5 | 955 | Water cooling | 500 | Comp. Ex. |
| | 34 | 2.0 | 3.0 | 955 | Water cooling | 500 | Comp. Ex. |
| | 35 | 2.0 | 2.5 | 955 | Water cooling | 500 | Comp. Ex. |
| | 36 | 2.0 | 0.6 | 1000 | Water cooling | — | Inv. Ex. |
| | 37 | 2.0 | 0.7 | 1000 | Water cooling | — | Inv. Ex. |
| | 38 | 2.0 | 0.8 | 1000 | Water cooling | — | Inv. Ex. |

*○: Oxygen concentration in atmosphere ≤ 1000/foxy, X: The relation was not satisfied.
**—: Air atmosphere (without adjustment of oxygen content)

TABLE 3

| Electric resistance welded steel pipe or steel tube No. | Steel No. | Amount of alloy elements in inclusions in electric resistance welded parts* Total amount of Si, Mn, Al, Cr and Ca (ppm (mass %)) | Tensile properties of matrix Yield strength YS (MPa) | Tensile strength TS (Mpa) | Low-temperature toughness of electric resistance welded parts $vE_{-60}$ (J) | HIC resistance of electric resistance welded parts CAR (%) | Fracture toughness of electric resistance welded parts CTOD value (mm) | Remarks |
|---|---|---|---|---|---|---|---|---|
| 1 | A | 15 | 540 | 600 | 169 | 1.4 | 1.2 | Inv. Ex. |
| 2 | A | 15 | 540 | 600 | 179 | 1.2 | 1.3 | Inv. Ex. |
| 3 | A | 12 | 540 | 600 | 195 | 0.8 | 1.4 | Inv. Ex. |
| 4 | A | 12 | 540 | 600 | 205 | 0.6 | 1.5 | Inv. Ex. |
| 5 | A | 10 | 540 | 600 | 203 | 0.5 | 1.5 | Inv. Ex. |
| 6 | B | 35 | 432 | 478 | 27 | 5.6 | 0.2 | Comp. Ex. |
| 7 | B | 27 | 432 | 478 | 40 | 5.3 | 0.2 | Comp. Ex. |
| 8 | B | 16 | 432 | 478 | 135 | 1.2 | 0.6 | Inv. Ex. |
| 9 | B | 15 | 432 | 478 | 145 | 1.0 | 0.7 | Inv. Ex. |
| 10 | B | 14 | 432 | 478 | 156 | 0.9 | 0.8 | Inv. Ex. |
| 11 | C | 13 | 610 | 678 | 135 | 2.0 | 0.6 | Inv. Ex. |
| 12 | C | 11 | 610 | 678 | 145 | 1.8 | 0.7 | Inv. Ex. |
| 13 | C | 13 | 610 | 678 | 125 | 2.2 | 0.5 | Inv. Ex. |
| 14 | C | 10 | 610 | 678 | 138 | 1.6 | 0.6 | Inv. Ex. |
| 15 | C | 8 | 610 | 678 | 154 | 1.5 | 0.8 | Inv. Ex. |
| 16 | D | 28 | 554 | 598 | 45 | 3.5 | 0.2 | Comp. Ex. |
| 17 | D | 20 | 554 | 598 | 66 | 3.3 | 0.2 | Comp. Ex. |
| 18 | D | 15 | 554 | 598 | 157 | 0.4 | 0.9 | Inv. Ex. |
| 19 | D | 15 | 554 | 598 | 168 | 0.3 | 1.0 | Inv. Ex. |
| 20 | D | 14 | 554 | 598 | 185 | 0.2 | 1.1 | Inv. Ex. |
| 21 | E | 16 | 570 | 618 | 132 | 1.9 | 1.0 | Inv. Ex, |
| 22 | E | 15 | 570 | 618 | 145 | 1.7 | 1.1 | Inv. Ex. |
| 23 | E | 12 | 570 | 618 | 145 | 1.5 | 1.2 | Inv. Ex. |
| 24 | E | 12 | 570 | 618 | 145 | 1.4 | 1.2 | Inv. Ex. |
| 25 | E | 10 | 570 | 618 | 150 | 1.2 | 1.3 | Inv. Ex. |
| 26 | F | 27 | 348 | 396 | 45 | 10.2 | 0.2 | Comp. Ex. |
| 27 | G | 26 | 620 | 689 | 12 | 35.0 | 0.1 | Comp. Ex. |

TABLE 3-continued

| Electric resistance welded steel pipe or steel tube No. | Steel No. | Amount of alloy elements in inclusions in electric resistance welded parts* Total amount of Si, Mn, Al, Cr and Ca (ppm (mass %)) | Tensile properties of matrix | | Low-temperature toughness of electric resistance welded parts vE$_{-60}$ (J) | HIC resistance of electric resistance welded parts CAR (%) | Fracture toughness of electric resistance welded parts CTOD value (mm) | Remarks |
|---|---|---|---|---|---|---|---|---|
| | | | Yield strength YS (MPa) | Tensile strength TS (Mpa) | | | | |
| 28 | H | 24 | 479 | 526 | 56 | 8.9 | 0.1 | Comp. Ex. |
| 29 | I | 56 | 510 | 566 | 4 | 24.0 | 0.1 | Comp. Ex. |
| 30 | J | 40 | 365 | 426 | 56 | 7.9 | 0.1 | Comp. Ex. |
| 31 | K | 42 | 597 | 658 | 41 | 32.0 | 0.2 | Comp. Ex. |
| 32 | L | 26 | 458 | 512 | 74 | 7.4 | 0.2 | Comp. Ex. |
| 33 | M | 30 | 519 | 569 | 60 | 58.0 | 0.2 | Comp, Ex. |
| 34 | N | 49 | 474 | 526 | 12 | 51.0 | 0.1 | Comp. Ex. |
| 35 | O | 25 | 503 | 567 | 41 | 15.6 | 0.2 | Comp. Ex. |
| 36 | P | 12 | 504 | 548 | 200 | 0.7 | 1.2 | Inv. Ex. |
| 37 | Q | 14 | 505 | 550 | 215 | 0.3 | 1.4 | Inv. Ex. |
| 38 | R | 15 | 523 | 575 | 185 | 0.9 | 0.9 | Inv. Ex. |

*Total amount of Si, Mn, Al, Ca and Cr present in inclusions having equivalent circle diameter of 8 μm or more In all of Examples according to embodiments, the viscosity of oxides formed during the electric resistance welding was not more than 2 poise, and consequently the total of silicon, manganese, aluminum, calcium and chromium present in inclusions in the electric resistance welded part having an equivalent circle diameter of 8 μm or more was decreased to 16 ppm or less; the tensile strength TS of the base metal was not less than 434 MPa; the electric resistance welded part had a CAR of not more than 3% after 200 hours of soaking in the NACE Solution A environment; the electric resistance welded part exhibited an absorbed energy vE$_{-60}$ exceeding 120 J in the Charpy impact test at −60° C.; and the CTOD value was not less than 0.3 mm. Thus, the electric resistance welded steel pipes or steel tubes of the Examples (Inv. Ex.) were demonstrated to have excellent HIC resistance, low-temperature toughness and fracture toughness. In contrast, Comparative Examples (Comp. Ex.) that were outside the scope of disclosed embodiments failed to achieve the desired properties because of any of the results in which the tensile strength TS was less than 434 MPa; the viscosity of oxides formed during the electric resistance welding exceeded 2 poise, and consequently the total of silicon, manganese, aluminum, calcium and chromium present in inclusions in the electric resistance welded part having an equivalent circle diameter of 8 μm or more was greater than 16 ppm; the electric resistance welded part had a CAR exceeding 3% after 200 hours of soaking in the NACE Solution A environment; the electric resistance welded part exhibited an absorbed energy vE$_{-60}$ of less than 120 J in the Charpy impact test at −60° C.; and the CTOD value at −20° C. was less than 0.3 mm.

In Comparative Examples in which the time between the onset of melting by heating and the upsetting was outside the preferred range (the electric resistance welded steel pipes or steel tubes No. 6, No. 7, No. 16 and No. 17), the viscosity of oxides formed during the electric resistance welding exceeded 2 poise, the total of silicon, manganese, aluminum, calcium and chromium present in inclusions in the electric resistance welded part having an equivalent circle diameter of 8 μm or more was greater than 16 ppm, the CAR after 200 hours of soaking in the NACE Solution A environment exceeded 3%, vE$_{-60}$ was less than 120 J, and the CTOD value was less than 0.3 mm. Thus, Comparative Examples (the electric resistance welded steel pipes or steel tubes No. 6, No. 7, No. 16 and No. 17) failed to achieve the desired properties. Comparative Example in which the C content was lower than the embodied range (the electric resistance welded steel pipe or steel tube No. 26) resulted in a tensile strength TS of less than 434 MPa and thus failed to satisfy the desired strength. In Comparative Examples in which the content of any of carbon, silicon, manganese, aluminum, calcium and chromium was higher than the embodied range (the electric resistance welded steel pipes or steel tubes No. 27, No. 29, No. 31, No. 33, No. 34 and No. 35), the CAR after 200 hours of soaking in the NACE Solution A environment exceeded 3%, vE$_{-60}$ was less than 120 J, and the CTOD value was less than 0.3 mm. Thus, Comparative Examples (the electric resistance welded steel pipes or steel tubes No. 27, No. 29, No. 31, No. 33, No. 34 and No. 35) failed to achieve the desired properties. In Comparative Examples in which the content of any of silicon, manganese and aluminum was lower than the embodied range (the electric resistance welded steel pipes or steel tubes No. 28, No. 30 and No. 32), the CAR after 200 hours of soaking in the NACE Solution A environment exceeded 3%, vE$_{-60}$ was less than 120 J, and the CTOD value was less than 0.3 mm. Thus, Comparative Examples (the electric resistance welded steel pipes or steel tubes No. 28, No. 30 and No. 32) failed to achieve the desired properties.

The invention claimed is:

1. An electric resistance welded steel pipe or steel tube including an electric resistance welded part, the steel pipe or steel tube having a chemical composition comprising:
   C: 0.03 to 0.59%, by mass %;
   Si: 0.10 to 0.50%, by mass %;
   Mn: 0.40 to 2.10%, by mass %;
   Al: 0.01 to 0.35%, by mass %;
   Ca: 0.0001 to 0.0040%, by mass %; and
   remaining Fe and unavoidable impurities as a balance, the Si content and the Mn content being such that Mn/Si (mass ratio) is in the range of 6.0 to 9.0,
   wherein the steel pipe or steel tube has a tensile strength TS of not less than 434 MPa, and
   in the electric resistance welded part the total amount of silicon, manganese, aluminum, calcium and chromium present in inclusions having an equivalent circle diameter of 8 μm or more is not more than 16 ppm in terms of mass % relative to the total mass of a 2 mm wide portion of the electric resistance welded part including base iron.

2. The electric resistance welded steel pipe or steel tube according to claim 1, wherein the chemical composition further comprises Cr: 0.01 to 1.09%, by mass %.

3. The electric resistance welded steel pipe or steel tube according to claim 1, wherein the chemical composition further comprises at least one of Cu: 0.01 to 0.35%, by mass %, Mo: 0.01 to 0.25%, by mass %, Ni: 0.01 to 0.20%, by mass %, and B: 0.0001 to 0.0030%, by mass %.

4. The electric resistance welded steel pipe or steel tube according to claim 1, wherein the chemical composition further comprises at least one of Nb: 0.001 to 0.060%, by mass %, V: 0.001 to 0.060%, by mass %, and Ti: 0.001 to 0.080%, by mass %.

* * * * *